March 16, 1954 — E. L. JONES — 2,672,488
PARTIAL OXIDATION OF HYDROCARBONS
Filed May 5, 1949
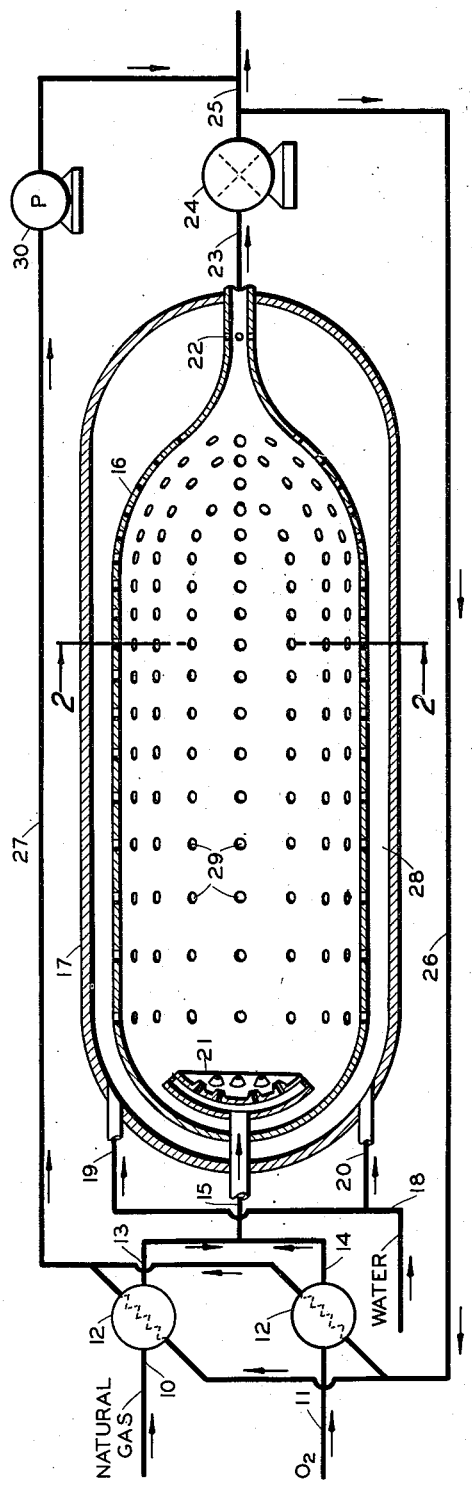
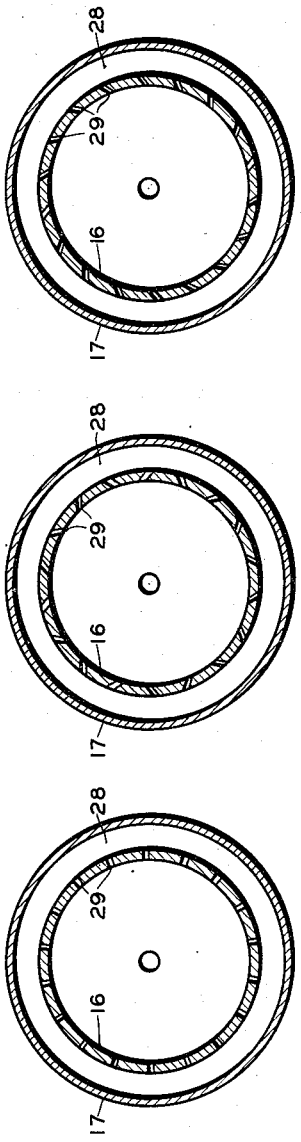
FIG. 1.
FIG. 2.
FIG. 3.
FIG. 4.
INVENTOR.
E. L. JONES
BY Hudson + Young
ATTORNEYS Patented Mar. 16, 1954

2,672,488

UNITED STATES PATENT OFFICE 2,672,488

PARTIAL OXIDATION OF HYDROCARBONS

Edward L. Jones, Okmulgee, Okla., assignor to Phillips Petroleum Company, a corporation of Delaware Application May 5, 1949, Serial No. 91,540

10 Claims. (Cl. 260—679)

This invention relates to a novel process and apparatus for the partial oxidation of hydrocarbons. In one of its more specific aspects, it relates to a process for the manufacture of acetylene and/or mixtures of carbon monoxide and hydrogen by oxidation of methane.

There has long been a problem of utilizing metal for chambers, tubes, etc., which must be heated to temperatures much above 1600 to 1700° F. Many reactions such as the oxidation of methane, or its most readily available form, natural gas, to produce acetylene, or to produce carbon monoxide and hydrogen synthesis gas for such processes as Fischer-Tropsch synthesis, methanol synthesis, Oxo synthesis (aldehydes and alcohols by reacting olefins with synthesis gas), are not economically operable at such low temperatures. The reaction to produce carbon monoxide and hydrogen most usually is carried out at temperatures above the 2000° F. mark and usually in the range of about 2300 to 2700° F. The reaction to produce acetylene by the partial oxidation of methane is also preferably carried out at temperatures too high to be withstood by most metal chambers. An alternative method is to utilize a chamber, such as one lined with a refractory material and containing refractory baffles, blocks, or other arrangements, so that the outer metal wall of the chamber is protected. In operating such a chamber, a combustible material is usually burned therein to supply heat. The burning is then discontinued and the reactants are introduced, utilizing the resident heat for the desired reaction. There are many obvious disadvantages to such an arrangement, one specific one being that continuous on-stream reaction may not be maintained due to the necessary shut downs for reheating. A still greater disadvantage is that a constant reaction temperature cannot be maintained thus causing considerable reduction in volume of product.

An object of my invention is to provide an improved process for the oxidation of methane to produce useful products. Another object of my invention is to provide a process whereby the oxidation of methane may be carried out at elevated temperatures usually above 2000° F. Another object is to manufacture acetylene by the partial oxidation of methane at elevated temperatures. Another object is to make a mixture of carbon monoxide and hydrogen by the oxidation of methane at elevated temperatures. Still another object is to manufacture acetylene and/or synthesis gas from natural gas. Another object is to provide an apparatus for the partial oxidation of methane. Another object is to provide an apparatus for the manufacture of acetylene and carbon monoxide and hydrogen. Other objects and advantages of this invention will be apparent to one skilled in the art from the accompanying disclosure and discussion.

I have discovered an improved method for oxidizing methane at elevated temperatures to produce acetylene and/or mixtures of carbon monoxide and hydrogen. More specifically, my invention embodies burning methane or natural gas in a jacketed reaction chamber, the inner wall of which contains a large number of small perforations through which water or other coolant and/or quench is introduced in such a manner that a film of water or steam is maintained on the inner surface of the reaction chamber and so that the reaction products are quenched by the steam: in the case of acetylene manufacture before complete oxidation is attained, and in the case of synthesis gas manufacture at the point where the desired ratio of hydrogen to carbon monoxide is attained by the water-gas shift reaction. The perforations in the reaction chamber are necessarily maintained small and preferably of a relatively uniform size. However, their number and thus their total cross sectional area should increase in the direction of flow of reactants through the reaction chamber so that the total flow rate of material into the chamber per increment of length increases in the direction of flow of the reactants.

In one embodiment of my invention, that in which acetylene is the primary object of manufacture, methane or natural gas and oxygen or air are preheated to a temperature up to about 1000° F., preferably individually, and then admixed and introduced to a reaction chamber of the type hereinafter described. The pressure maintained within the chamber is not too critical, however, in a preferred embodiment it is desirable to maintain a pressure of from atmospheric to say 1500 p. s. i., and preferably in the range of atmospheric to 1000 p. s. i. The reactants are introduced to the chamber in such proportions and burned therein in such a manner that the methane is partially oxidized at a temperature in the broad range of 1300 to 5000° F., but preferably in the range of 3000 to 5000° F. It is always necessary to use a quantity of oxygen less than the theoretical amount required for complete combustion of the hydrocarbon in the feed, however, there must be enough present to provide sufficient heat to maintain the desired reaction. A suitable contact time for the reactants is 0.10 to 0.005 second and specifically about 0.04 second. Following the brief contacting, the materials are rapidly quenched to a temperature at least as low as 1000° F. by suitable means such as steam or other gas such as nitrogen or carbon dioxide. For the production of maximum yields of acetylene, the highest possible temperature and shortest contact time should be used.

The reaction chamber utilized for the above described reaction may be constructed of any metal which will withstand the high temperatures generated by the reaction. For example, high carbon steel or steel containing small amounts of tungsten or molybdenum is very satisfactory. It is well known that at present no available metal will withstand temperatures in the neighborhood of 5000° F. and for this reason, I have provided numerous perforations in the reaction chamber to allow the passage of water or other cooling and/or quench materials previously named. When operating in this manner, the inner perforate reaction chamber is jacketed to provide a space for containing the coolant. The inner chamber is so constructed that the coolant for the metal reaction chamber is also the quench material for the reaction products.

As the coolant and quench material are continuously introduced through the small perforations of the chamber, it forms a protective layer along the inner wall. When the temperatures are relatively low, this layer or film may be water when water is used, but at the higher temperatures, it will be steam or other gas. The charge stocks to the reaction may be preheated by means of heat exchange with the effluent products. The advantage of using steam as a quench for the acetylene is that the two may be separated by condensing the steam. The attached drawings and the discussion thereof will show further how the cooling and quench material may be passed through the inner shell of the reaction chamber.

In the practice of my process for the production of acetylene, yields in the range of 6 to 10 per cent may be obtained when using oxygen rather than air. The yield may even range upward to 20 per cent when sufficiently high temperatures are used.

In the second embodiment of my invention wherein the major purpose is to produce hydrogen and carbon monoxide such as for use in synthesis gas, the following general procedure is carried out. In this embodiment as in the one wherein the major object is to produce acetylene, the reaction apparatus is the same, however, the conditions are altered somewhat. In this embodiment, natural gas or methane and oxygen or air are preheated to about 1000° F. and admixed with one another prior to introduction to the reaction chamber. The admixture is then introduced to the reaction zone where the hydrocarbon is partially oxidized at a temperature in the range of 2000 to 2700° F. and a pressure in the range of atmospheric to say 800 p. s. i. Preferred ranges of temperature and pressure are 2300 to 2500° F. and 50 to 400 p. s. i. Suitable contact times are considerably longer than those applicable in the production of acetylene and fall within the range of, say, 0.02 to 2 seconds and preferably 0.1 to 1.5 seconds. When synthesis gas is the major product, it is desirable to produce it at pressures similar to those at which it is to be used. However, this may not be feasible in all cases since some processes using hydrogen and carbon monoxide as a charge stock, such as the Oxo process, are operated at quite high pressures. When the synthesis gas is used for such processes, it is preferable to make it at as high pressures as possible and then to compress it to the pressures required. By so operating, a minimum of compression of the synthesis gas is required.

When making synthesis gas several different coolants may be used to protect the walls of the reaction chamber and to quench the products. For example, liquid oxygen, liquid carbon dioxide, water, liquid nitrogen, etc., may be used depending somewhat on the ratio of hydrogen to carbon monoxide desired. It is known that the use of steam in the manufacture of synthesis gas will increase the $H_2/CO$ ratio while the use of carbon dioxide will decrease same. Oxygen will not change the ratio and neither will nitrogen or other inert materials. Although the above materials have been mentioned as cooling and quenching agents, it is apparent that while quenching the synthesis gas some of them will react with it and will exert a considerable effect on the ratio of $H_2/CO$ by means of the water gas shift reaction which is represented by the following Equation 1:

(1)  $CO_2 + H_2 \rightleftharpoons CO + H_2O$

As discussed above, steam will make the reaction go to the left thus increasing the proportion of hydrogen, and carbon dioxide will make it go to the right, producing the opposite effect.

A more clear understanding of some of the many aspects of my invention may be had by referring to the attached drawings. Figure 1 is a longitudinal cross-sectional view of my apparatus in conjunction with a flow diagram. Figures 2 and 3 are cross sections through the reaction chamber of Figure 1 taken along lines 2—2 showing three different arrangements of inlets for the cooling and quench material. Figure 4 is similar to Figures 2 and 3 with a different positioning of the inlets to the reaction chamber. Similar portions of the apparatus in the several drawings are similarly numbered.

Refer now to Figure 1. Natural gas and air which supply the methane and oxygen for either the production of acetylene or hydrogen and carbon monoxide synthesis gas are passed via lines 10 and 11 to heat exchangers 12 where they are preheated to a temperature up to about 1000° F. by indirect heat exchange with the quenched reaction products. From the heat exchangers, the preheated natural gas and oxygen are passed via lines 13 and 14 to line 15 in which they are admixed and through which they are passed to concave burner 21 inside the reaction chamber.

Number 16 indicates the elongated cylindrical perforate steel reaction chamber within which the partial oxidation and dehydrogenation reactions take place to produce synthesis gas and acetylene. The inlet end of said chamber is preferably in a dome shape, while the opposite end is preferably of ever decreasing radius and in somewhat of a cone shape. Number 17 indicates the outer steel shell which forms the jacket around chamber 16 providing space 28 therebetween. Numbers 29 indicate the uniformly spaced circumferentially positioned inlets for the coolant lying in planes passing at right angles through the axis of the reaction chamber. These inlets may be either at right angles to the surface of the chamber or may be positioned along the plane passing therethrough which is at a right angle with the axis of the chamber. The total cross sectional area of these inlets increases in the direction of flow materials through said chamber. In this way, more coolant and quench material is introduced progressively in the downstream direction. Water or other cooling and quenching material is passed via line 18 to lines 19 and 20 through which it is introduced to space 28 between chamber 16 and jacket 17. A final quench inlet, number 22, is provided for the reaction products in the outlet from the reaction chamber between the ends of the reaction chamber and jacket. This is utilized to insure cooling of the products to 1000° F. or below. The product materials are passed via line 23 to turbine 24 where the pressure is utilized for the generation of power. After passing through turbine 24, the product materials are passed through line 25 to a storage unit or to a separation and recovery unit. A portion of the product is passed from line 25 via line 26 to heat exchanger 12 by means of blower 30. After heating the natural gas and air, the cooled product gases are passed via line 27 back to line 25 at a point downstream from the point at which the gas was removed.

It is within the scope of my invention that the reaction chamber may be of a design other than cylindrical and that the ends may also be of shapes other than those specifically described. However, for best operation and pressure resistance, the design as disclosed is preferred. Also the position of the perforations may be other than radial such as tangential, see Figure 4, all pointing in the same direction, or tangential with each perforation pointing in the opposite direction to the one next to it as shown in Figure 3.

Refer now to Figure 2 which illustrates one embodiment of the coolant and quench material inlets 2. Number 17 is the outer jacket axially positioned with respect to reaction chamber 16. Space between these two into which the coolant and quench material is introduced is numbered 28. Number 29 indicates radially positioned perforations in the wall of chamber 16 through which the coolant and quench material are passed from space 28. This positioning of the perforations enables the coolant to not only protect the reaction chamber walls, but to also diffuse into the reaction zone and react with the other materials present.

Refer to Figure 4 which is similar to Figure 2 except for the position of the coolant and quench inlets. These inlets 29 have been placed in a substantially tangential position with respect to reaction chamber 16 so that a better blanket of coolant may be maintained along the inner walls of the reaction chamber. The coolant travels around the walls of the chamber when introduced in this manner and does not admix with the other materials as rapidly. It may be desirable in certain instances to construct the reaction chamber so that the coolant and quench inlets closest to the burner are positioned as shown in Figure 3 and those downstream from the burner positioned as shown in Figure 2. In this manner more complete protection of the reaction chamber is had.

Figure 3 is also similar to Figure 2 except for the position of the inlets. In this embodiment, the inlets 29 are placed in an angular position, every other inlet pointing in the opposite direction from the adjoining inlet. In this manner a thicker turbulent layer of protective coolant is provided. It is also within the scope of my invention to use combinations of inlets shown in Figures 2-4 to provide adequate cooling and quenching at all parts of the reaction chamber.

Advantages of this invention are illustrated by the following example. The reactants and their proportions are presented as being typical and should not be construed to limit the invention unduly.

Example

Natural gas, containing 95 volume per cent methane, and oxygen, in a volume ratio of 3 to 1, are preheated separately to 700° F. The two preheated materials are then admixed and introduced to a reactor as I have previously described wherein the methane is partially oxidized at a temperature of 3800° F. and under a pressure of 500 p. s. i. The contact time used is 0.01 second. The reaction products are quenched with steam introduced through the perforations of the reaction chamber walls to 950° F. The quenched products are then passed to a recovery process wherein the acetylene, synthesis gas, and steam are separated. By operating in this manner, a product comprising about 8 volume per cent acetylene is obtained.

An additional advantage of using this process and apparatus is that an inert diluent such as nitrogen usually required for the manufacture of acetylene from natural gas is done away with by the use of oxygen to burn with the natural gas and the use of a quench material such as water which acts as a diluent and which may be condensed, and easily separated. By proceeding in the above described manner, separation of the reaction products is much more easily accomplished.

Although this invention has been described and exemplified in terms of its preferred modifications, it is understood that various changes may be made without departing from the spirit and scope of the disclosure and of the claims.

I claim:

1. A process for the partial oxidation of methane which comprises introducing preheated methane and oxygen to a reaction chamber, reacting said methane and oxygen using a quantity of oxygen less than the theoretical amount required for complete combustion of methane so that said methane is only partially oxidized, simultaneously forming a protective blanket along the inner walls of the reaction chamber by introducing a first increment of a coolant and quench fluid adjacent the inlet end of said reaction chamber at a rate sufficient to maintain said protective blanket, introducing further portions of said coolant and quench fluid at a progressively greater rate proceeding in the downstream direction to progressively remove heat in addition to cooling the reaction chamber walls by the protective blanket, and rapidly quenching the reaction products therewith, and separating and recovering the partial oxidation products.

2. A process according to claim 1 wherein said oxygen is used in the form of air.

3. A process according to claim 1 wherein said methane is used in the form of natural gas.

4. A process for the manufacture of acetylene by the partial oxidation of methane which comprises preheating a methane-containing gas and oxygen; introducing the preheated gases to a suitable reaction chamber; reacting methane and oxygen at a temperature in the range of 1300 to 5000° F., a contact time in the range of 0.10 and 0.005 second, and a pressure in the range of atmospheric to 1500 pounds per square inch;

simultaneously forming a protective blanket along the inner walls of the reaction chamber by introducing a first increment of a coolant and quench fluid adjacent the inlet end of said reaction chamber at a rate sufficient to maintain said protective blanket, introducing further portions of said coolant and quench fluid at a progressively greater rate proceeding in the downstream direction to progressively remove heat in addition to cooling the reaction chamber walls by the protective blanket, rapidly quenching the reaction products; and separating the partial oxidation products and recovering acetylene as a product of the process.

5. A process for the manufacture of acetylene by the partial oxidation of methane which comprises preheating a methane-containing gas and oxygen to a temperature up to 1000° F.; admixing the preheated gases and introducing same to a suitable reaction chamber; reacting the methane from said gas with said oxygen at a temperature in the range of 3000 to 5000° F., a contact time of about 0.04 second and a pressure in the range of atmospheric to 1000 pounds per square inch; simultaneously forming a protective blanket along the inner walls of the reaction chamber by circumferentially introducing a first increment of a coolant and quench fluid adjacent the inlet end of said reaction chamber at a rate sufficient to maintain said protective blanket, introducing further portions of said coolant and quench fluid at a progressively greater rate proceeding in the downstream direction to progressively remove heat in addition to cooling the reaction chamber walls by the protective blanket, rapidly quenching the reaction products; and separating the thus quenched partial oxidation products and recovering acetylene therefrom as a product of the process.

6. A process according to claim 5 wherein said methane-containing gas is natural gas.

7. A process according to claim 5 wherein said coolant and quench material is $H_2O$.

8. A process for the manufacture of carbon monoxide and hydrogen by the partial oxidation of methane which comprises preheating a methane-containing gas and an oxygen-containing gas, introducing the preheated gases to a suitable reaction chamber; reacting methane and oxygen using a quantity of oxygen less than the theoretical amount required for complete combustion of methane so that the methane is only partially oxidized; simultaneously forming a protective blanket along the inner walls of the reaction chamber by introducing a first increment of a coolant and quench fluid adjacent the inlet end of said reaction chamber at a rate sufficient to maintain said protective blanket, introducing further portions of said coolant and quench fluid at a progressively greater rate proceeding in the downstream direction to progressively remove heat in addition to cooling the reaction chamber walls by the protective blanket, and so that the desired ratio of carbon monoxide to hydrogen is obtained; rapidly quenching the reaction products; and recovering carbon monoxide and hydrogen in the desired predetermined ratio as products of the process.

9. A process for the manufacture of carbon monoxide and hydrogen by the partial oxidation of methane, which comprises preheating a methane-containing gas and an oxygen-containing gas; introducing the preheated gases to a suitable reaction chamber; reacting methane and oxygen at a temperature in the range of 2000 to 2700° F., a contact time in the range of 0.02 to 2.0 seconds, and a pressure in the range of atmospheric to 800 pounds per square inch; simultaneously forming a protective blanket along the inner walls of the reaction chamber by circumferentially introducing a first increment of a coolant and quench fluid adjacent the inlet end of said reaction chamber at a rate sufficient to maintain said protective blanket, introducing further portions of said coolant and quench fluid at a progressively greater rate proceeding in the downstream direction to progressively remove heat in addition to cooling the reaction chamber walls by the protective blanket, rapidly quenching the reaction effluent; and separating the partial oxidation products and recovering therefrom carbon monoxide and hydrogen as a product of the process.

10. A process for the manufacture of carbon monoxide and hydrogen by the partial oxidation of methane which comprises preheating a methane-containing gas and oxygen to a temperature up to 1000° F.; admixing the preheated gas and introducing same to a suitable reaction chamber; reacting methane with oxygen at a temperature in the range of 2300 to 2500° F., a contact time of 0.1 to 1.5 seconds, and a pressure in the range of 50 to 400 pounds per square inch; simultaneously forming a protective blanket along the inner walls of the reaction chamber by circumferentially introducing a first increment of a coolant and quench fluid adjacent the inlet end of said reaction chamber at a rate sufficient to maintain said protective blanket, introducing further portions of said coolant and quench fluid at a progressively greater rate proceeding in the downstream direction to progressively remove heat in addition to cooling the reaction chamber walls by the protective blanket, rapidly quenching the reaction products; and separating the partial oxidation products and recovering therefrom carbon monoxide and hydrogen as a product of the process.

EDWARD L. JONES.

References Cited in the file of this patent

UNITED STATES PATENTS

| Number | Name | Date |
| --- | --- | --- |
| 1,430,035 | Snelling | Sept. 26, 1922 |
| 1,894,766 | Harrison | Jan. 17, 1933 |
| 1,918,254 | Faber | July 18, 1933 |
| 1,960,608 | Weber et al. | May 29, 1934 |
| 2,011,339 | Hillhouse | Aug. 13, 1935 |
| 2,220,304 | Tracy | Nov. 5, 1940 |
| 2,366,669 | Maude | Jan. 2, 1945 |
| 2,377,245 | Krejci | May 29, 1945 |
| 2,377,847 | Allen et al. | June 12, 1945 |
| 2,431,632 | Brandt | Nov. 25, 1947 |
| 2,466,617 | Spring | Apr. 5, 1949 |

FOREIGN PATENTS

| Number | Country | Date |
| --- | --- | --- |
| 291,253 | Great Britain | May 31, 1928 |